Sept. 28, 1937. W. G. SWANSON 2,094,194
WATERER FOR POULTRY
Filed Aug. 22, 1936
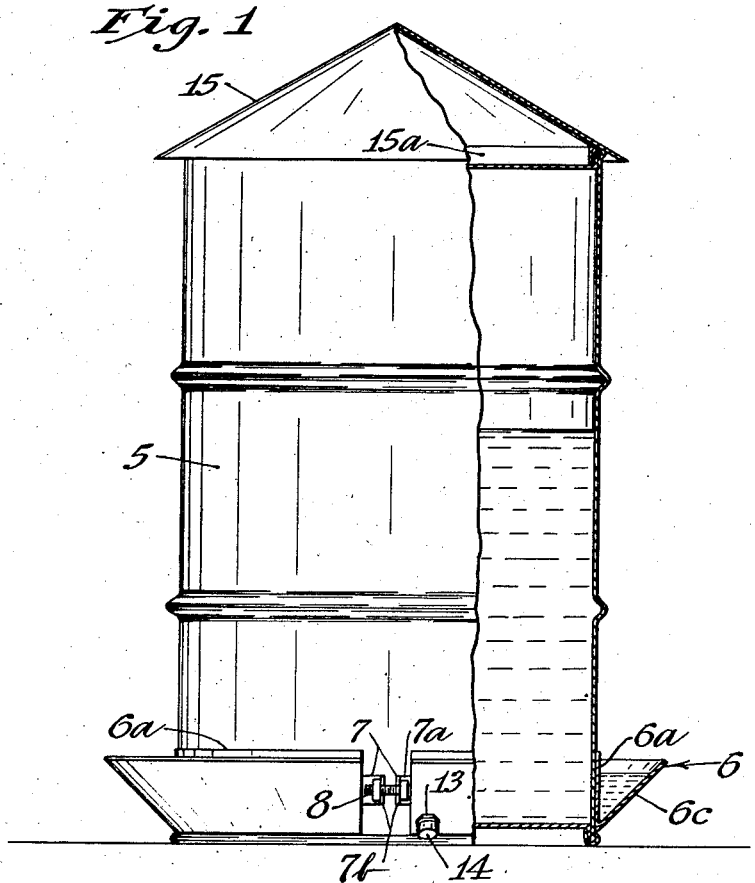
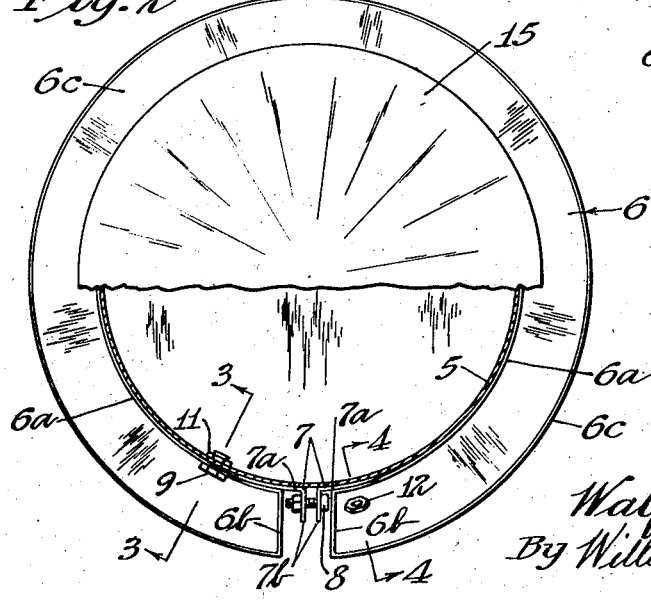
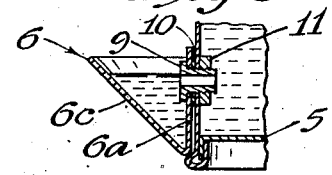
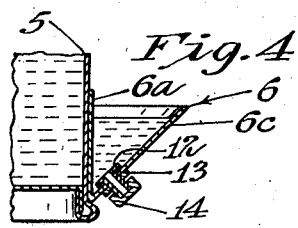
Inventor
Walfred G. Swanson
By Williamson & Williamson
Attorneys Patented Sept. 28, 1937

2,094,194

UNITED STATES PATENT OFFICE 2,094,194

WATERER FOR POULTRY

Walfred G. Swanson, Swanville, Minn.

Application August 22, 1936, Serial No. 97,382

7 Claims. (Cl. 119—77)

My invention relates to liquid dispensing apparatus and particularly to watering devices for poultry.

The general object of my invention is to provide an especially satisfactory waterer for poultry designed to normally maintain a constant level of water in a trough portion thereof and arranged to facilitate rapid and thorough flushing of the trough portion thereof.

Another object is to provide such a waterer incorporating a trough portion particularly adapted for rapid and easy attachment thereof to any upstanding cylindrical reservoir of suitable diameter.

A further object is to provide such a waterer of simple, rugged and inexpensive construction.

These and other objects and advantages of the invention will be more fully set forth in the following description made in connection with the accompanying drawing, in which like reference characters refer to similar parts throughout the several views and in which:—

Fig. 1 is a partially broken-away, partially sectional vertical view,

Fig. 2 is a partially broken-away, partially sectional top-view,

Fig. 3 is a vertical sectional view taken along the line 3—3 of Fig. 2 as indicated by the arrows, and Fig. 4 is a vertical sectional view taken along the line 4—4 of Fig. 2 as indicated by the arrows.

Referring to the drawing, the numeral 5 designates a reservoir for containing water, this reservoir preferably being of upstanding cylindrical form is shown. I have found it convenient to utilize a conventional steel oil drum or barrel as the reservoir 5 and, accordingly, have illustrated the reservoir 5 as of such construction. The reservoir 5 is of course normally disposed vertically as indicated in Fig. 1.

A trough is provided which encircles the lower portion of the periphery of the reservoir 5 in the manner of a collar and is preferably contracted or drawn tight thereabout so as to firmly grip the same. To this end a trough 6 is arranged to extend at its inner side along at least the major portion of a circle corresponding in diameter to the peripheral diameter of the reservoir 5. The trough 6 is placed in encircling relation with the lower portion of the reservoir 5 and is supported therefrom by any suitable method such as, for instance, by contracting the trough to effect gripping of the reservoir 5 thereby.

While the trough 6 could have any one of a number of different cross-sectional shapes, I prefer to make it of generally V-shaped cross-sectional shape with the inner wall 6a thereof disposed vertically so as to comprise a clamping band to be drawn tightly about the reservoir 5 by means to be described.

The interior of the trough 6 is to be discontinuous or interrupted so as to have ends rather than to extend through a complete circle in an endless manner. While the interior of an endless annular trough structure could be made discontinuous by placing a transverse wall therein I prefer to use a trough 6 extending through slightly less than a complete circle and having end wall 6b facing each other in moderately spaced, substantially parallel relation as shown in Figs. 1 and 2. Such construction lends itself nicely to provision of means for contracting or clamping the trough 6 about the reservoir 5.

Means for drawing the respective ends of the trough 6 toward each other is provided. For this purpose each end of the clamping band or inner trough-wall 6a is provided with a strip 7 of material bent in its medial portion to form two legs 7a and 7b disposed substantially at right angles to each other. The legs 7a of the respective strips 7 are suitably secured to the respective end portions of the clamping band 6a in such positions that the respective remaining legs 7b thereof will extend outwardly of the reservoir 5 in the space between the respective end walls 6b of the trough 6 in parallel somewhat spaced relation as shown. A nutted clamping bolt 8 extends through aligned apertures in the respective outwardly extending legs 7b of the strips 7 and may be drawn up to contract or clamp the trough 6 about the reservoir 5 in an obvious manner.

The interior of the trough 6 is provided at one of its end portions with means for admitting water thereinto from the interior of the reservoir 5 and at the other of its end portions with normally closed openable means for draining water therefrom whereby water may be caused to flow into the trough from said water admission means, through substantially the entire length of the trough, and out of the trough through said drain means. Provision for producing such flow through the entire length of the trough obviously enables complete and effective flushing of the interior of the trough for cleansing purposes.

The water admission means from the interior of the reservoir into the interior of the trough 6 essentially comprises a passage therebetween. Preferably this passage should extend through the peripheral wall of the reservoir 5 and the inner wall 6a of the trough 6 at such level that the upper limit of the outlet end of the passage is disposed at the level to which it is desired to keep the trough 6 filled with water. With such an arrangement it is commonly known that the flow of water through the passage will automatically assume such magnitudes as to maintain the water level in the trough 6 at the desired point. The passage referred to is provided by extending a headed, hollow, externally screw threaded element 9 through registering apertures in the inner trough wall 6a and the peripheral wall of the reservoir 5. A sealing washer 10 is placed between the wall 6a and the reservoir wall in encircling relation to the element 9 and a nut 11 is drawn up tightly on the free end of the element 9 to draw the two walls, the washer 10 and the element 9 into sealed relation with each other.

The drain means is produced by extending a hollow, headed, externally screw-threaded element 12, similar to the above described element 9 in an aperture formed in the lower portion of the outer wall 6c of the trough 6 with its free end disposed outermost. A nut 12 is placed on the free end of the element 12 and drawn up against the wall 6c. An internally screw-threaded cap 14 is screwed onto and removed from the free end of the element 12 when it is desired to respectively close and open the drain device.

To prevent poultry from perching on the upper portion of the reservoir 5 a conical cover or roof 15, formed of sheet metal or other suitable material, is placed on the upper end of the reservoir 5. A depending annular flange 15a formed in the cover 15 fits snugly into the annular upper end portion of the reservoir 5 to prevent displacement of the cover 15.

It is apparent that I have invented a novel, improved, sanitary, rugged and inexpensive type of automatic poultry waterer.

It will, of course, be understood that various changes may be made in the form, details, proportions and arrangement of the parts, without departing from the scope of my invention, which, generally stated, consists in a device capable of carrying out the objects above set forth and in the novel parts and combinations of parts disclosed and defined in the appended claims.

What is claimed is:—

1. A waterer for poultry comprising an upstanding cylindrical reservoir adapted for containing water, an annularly extending trough substantially circumferentially encircling said reservoir, and means for contracting said trough about said reservoir, said reservoir and said trough being arranged to permit flow of water from said reservoir into said trough.

2. A waterer for poultry comprising an upstanding cylindrical reservoir adapted to be filled with water, a trough extending circumferentially about said reservoir and having respective ends slightly spaced circumferentially, and means for drawing said ends toward each other to clamp said trough about said reservoir, said reservoir and said trough being provided with communication therebetween for flow of water from said reservoir into said trough.

3. A waterer for poultry comprising an upstanding cyclindrical reservoir adapted to be filled with water, a trough extending circumferentially about said reservoir with its respective ends disposed in facing slightly spaced relation, means for drawing said ends toward each other to contract said trough about said reservoir, said reservoir and said trough being provided with respective apertures in registration with each other, and means sealing together the apertured portions of said reservoir and said trough.

4. A waterer for poultry comprising an upstanding cylindrical reservoir adapted to be filled with water, a trough extending circumferentially about said reservoir and having respective ends slightly spaced circumferentially, said trough being of generally V-shaped cross-section with the inner side thereof disposed vertically so as to comprise a clamping band, means for drawing said band into clamping relation with the periphery of said reservoir and means affording a water-conducting passage from the interior of said reservoir to the interior of said trough.

5. Watering apparatus for poultry comprising a trough extending through all but a relatively short portion of a horizontally disposed circle, said trough being of generally V-shaped crosssection with the inner side thereof disposed vertically so as to comprise a clamping band adapted to encircle the periphery of an upstanding cylindrical water containing reservoir of suitable diameter and means for drawing said band into clamping relation with such a reservoir encircled thereby.

6. The structure defined in claim 5 and said trough having an aperture in the inner side thereof adapted for registration with a similar aperture formed in the peripheral wall of a reservoir encircled by said trough.

7. The structure defined in claim 5 and said trough having an aperture in the inner side thereof adapted for registration with a similar aperture formed in the peripheral wall of a reservoir encircled by said trough and means for sealing together the respective registering apertured portions of said trough and such reservoir.

WALFRED G. SWANSON.